UNITED STATES PATENT OFFICE.

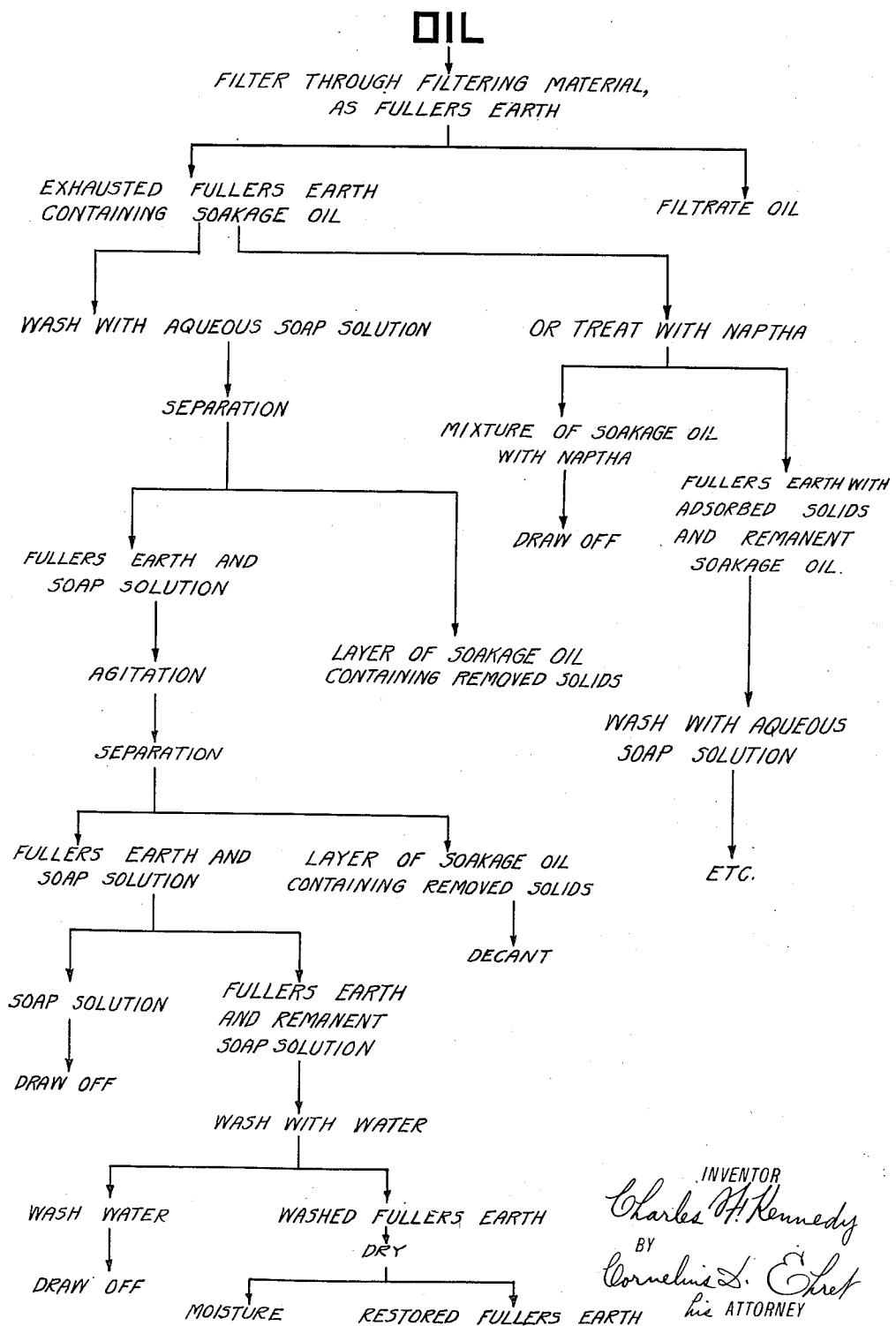

CHARLES F. KENNEDY, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

REVIVIFICATION OF FILTERING AGENTS.

1,356,631.  Specification of Letters Patent.  Patented Oct. 26, 1920.

Application filed August 11, 1919. Serial No. 316,587.

*To all whom it may concern:*

Be it known that I, CHARLES F. KENNEDY, a citizen of the United States, residing in the city and county of Philadelphia, State of Pennsylvania, have invented certain new and useful Improvements in Revivification of Filtering Agents, of which the following is a specification.

My invention relates to the treatment of filtering agents, generally granular or in fine or small subdivision and usually employed in bulk, such as fullers' earth, bone black, char or charcoal, kieselguhr, bauxite and the like, for improving, maintaining or restoring more or less completely their powers for removing impurities, particularly those causing or imparting color, odor or taste, from liquids, or materials which may be readily rendered liquid, especially without decomposition, as for example, petroleum and petroleum products, including wax and oil, vegetable and animal fats and oils, waxes of various kinds, as ceresin, Montan wax, bees wax, etc., aqueous solutions, as of sugar, etc.

My invention resides in methods of improving before or after use, and in the methods of revivifying or restoring more or less completely to original efficiency or capacity such filtering materials, and particularly fullers' earth, after they have been used in filtering liquid, particularly petroleum or petroleum products in the case of fullers' earth, and have become more or less spent or exhausted, by washing the filtering agent or material with an aqueous solution of soap of suitable concentration for effecting a removal from the filtering agent of the solids or material adsorbed or gathered thereon, and preferably also for effecting removal of the oil or other material held as soakage in the filter material.

My invention resides in the method of treating filtering agents as hereinafter described and claimed.

For an illustration of a mode of carrying out my invention, reference may be had to the accompanying drawing, which is a chart illustrative of some of the various modes of practising my invention.

For an understanding of my invention, I shall, as an example, describe the revivification of fullers' earth which has been used in filtering petroleum or petroleum product.

Raw or fresh fullers' earth, as it is received from the mine, is prepared in any suitable way, as by drying, granulation, screening and calcining, for first use upon petroleum or petroleum product, for example, lubricating stock. The fullers' earth is charged in mass in a suitable receptacle, and the oil or other liquid allowed to percolate therethrough.

The operation thus far described is indicated in the drawing as producing an oil filtrate and leaving fullers' earth, which is more or less spent or exhausted, especially after considerable or long use, because of colloidal particles or solids adsorbed or collected upon the earth particles, these colloids or solids being those which imparted color to the oil and which have been removed by the action of the fullers' earth. The fullers' earth at this stage contains also the soakage oil, that which is held in the interstices between the particles of the fullers' earth and to some extent in the pores thereof. The earth is washed, either after removal from the filter receptacle or while remaining in that receptacle if desired or suitable, with an aqueous solution of any suitable soap. The soap solution is brought into intimate contact with all the granules of fullers' earth by suitable agitation, as by mechanical means; or mild agitation may be effected by blowing air or steam through the mass of earth and soap solution. The washing is carried on at suitable temperatures depending upon the nature of the oil or oily material involved. For example, with very light oils or oils of low viscosity this washing may take place at ordinary temperatures. With heavier oils or oils of higher viscosity, or in the case where melted paraffin wax has been filtered, suitable temperature is applied to keep the soakage oil or wax at suitable fluidity. The duration of the washing operation or agitation of the earth in the presence of the soap solution will vary with the nature of the material which has been filtered through it. For example, for light or spindle oils the agitation with soap solution may continue from 3 to 4 hours; on heavier stocks and wax from 6 to 8 hours. The result of the washing with soap solution is the removal of the soakage oil from the earth and dislodgment or removal of the colloidal solids or other material adhering to or adsorbed upon the fullers' earth granules; these colloidal solids or other material pass off with the separated soakage oil. Agitation is discontinued and the mass allowed to stand, for say two hours. The oil charged with the removed solids rises to the top as an oily layer and is separated or removed by decantation or otherwise, leaving fullers' earth and aqueous soap solution, which are preferably again agitated and allowed to separate, again yielding a supernatant layer of soakage oil, containing further amounts of removed solids, which is removed in any suitable way, as by decantation. There is again left fullers' earth and soap solution; the latter is drawn off, leaving fullers' earth containing soakage soap solution. The mass is agitated or washed with freshly added water which washes out the soap solution, the wash water being drawn off, leaving washed fullers' earth. It will be understood that the washing with water last described may be repeated if suitable or desirable. When the wash water has been drawn off, there is left fullers' earth which is then dried by raising it to any suitable temperature by any suitable means. Ordinarily a temperature of 300 to 350 degrees F., applied for suitable time, as 6 to 12 hours, will suffice. In this connection it will be understood, however, that higher temperatures, even calcining temperatures, may be resorted to, though these latter are not preferred and may sometimes produce effects more or less detrimental to the fullers' earth. The preferred drying referred to, however, may be readily accomplished by steam coil within or outside of the earth receptacle or by a passage of superheated steam through the earth. The effect of the drying operation is to drive off moisture, leaving restored or revivified fullers' earth which may now again be used upon oil with the efficiency and effect of prepared fresh fullers' earth, until again more or less spent or exhausted, when it may again be treated as above described and restored, and so repeatedly used and treated.

While the foregoing mode of procedure is my preferred one, particularly in that it avoids the use of naphtha or equivalent as heretofore commonly employed in removing soakage oil from fullers' earth, nevertheless it will be understood that, as indicated as an alternative in the drawing, my invention comprehends also the following procedure.

The fullers' earth containing soakage oil and more or less clogged with removed solids may be treated with naphtha or equivalent material which acts as a solvent or diluent for the soakage oil which then readily separates from the fullers' earth. The treatment with naphtha preferably is followed by blowing steam through the earth to drive off the naphtha and soakage oil as completely as possible. There is left fullers' earth with adsorbed solids or colloids or other material extracted from the oil, with some small amount of soakage oil. The fuller's earth in this condition is then washed with an aqueous solution of soap, followed by any suitable steps, such, for example, as in my above described preferred mode of procedure.

By subjecting the fullers' earth to the washing operation described, there is produced a restored or revivified fuller's earth which has not been materially changed either physically or chemically, the structure and size of the individual earth particles remaining the same, without loss, such as occasioned by erosion in producing dust or subdivision of the particles.

In accordance with my preferred mode of procedure, the heretofore commonly practised washing of the fullers' earth with naphtha is eliminated. The capacity of the fullers' earth for decolorizing or other filtration effects is completely restored and conserved, without reduction of size of the earth granules and without earth losses due to handling or erosion, heretofore resulting in losses in the form of dust or extremely fine particles. The cost of operation is materially reduced, as is also the cost of the equipment necessary for carrying out my method.

The recovered soakage oil may be charged back into fresh batches of oil to be filtered, so that the soakage oil need not be as heretofore transferred into lower grades of oil, but is saved as of the same quality as the oil of the batch of which it was a part.

For washing fullers' earth which has been used in filtering petroleum or petroleum products, I prefer to use as the soap or a substantial part thereof the alkali metal or ammonium salts of organic, as sulfonic, acids, such as result from the treatment of petroleum with strong or fuming sulfuric acid, and more particularly, alkali metal or ammonium salts of the sulfonic acids found in or derived from acid sludge or from acid coke produced from acid sludge resulting from treatment by strong or fuming sulfuric acid of petroleum or petroleum product or distillate; or other water soluble salts of such acids such as those of the alkaline earths. These preferred and more efficient acids and their salts are of the character described in U. S. patent to Taveau No. 1,271,387, and are available in great quantities and of suitable degree of purity and concentration. By preference, however, the sulfonic acids or their sulfonates, as sodium sulfonates, are freed more or less completely from asphaltic bodies with which they are associated if derived from acid sludge or acid coke.

While these soaps may be produced by neutralization of the sulfonic acids referred to with sodium or other alkali metal or ammonium hydroxids, or by neutralization with the hydroxids of the alkaline earth metals, they may be neutralized with sodium or other suitable carbonates or bicarbonates, etc., or by the carbonates or bicarbonates, etc., of the alkaline earth metals.

In washing neutralized treated oils resulting from acid treatment of an oil with strong or fuming sulfuric acid, so-called milk water is formed which may be used as the aqueous solution for washing the fullers' earth. Such milk water contains so-called milk water soaps, which are suitable washing agents for my purposes.

Or milk water may be treated with dilute mineral acid, causing reformation of sulfonic acids from sulfonates with a separation into a layer of oil containing the sulfonic acids and a lower layer of dilute mineral acid, which latter is drawn off. The oil containing the sulfonic acids may be agitated with concentrated aqueous solution of sodium hydroxid or equivalent, yielding a mineral oil soft soap, which latter in suitable aqueous solution may be used for the herein described washing of fullers' earth.

It will be understood that the aforementioned soaps are utilizable, not only for washing fullers' earth, but other filtering agents, as bone black, char or charcoal, kieselguhr, bauxite, etc., and without regard to the nature of the liquid or material which has been filtered through them.

For washing all of the filtering materials herein referred to, other soaps than the above described sulfonic soaps may be employed. For example, there may be used the alkali soaps of palmitic, stearic, oleic or similar acids, of rosin and similar acids, of naphthenic acid found in certain crude petroleums and distillates thereof, the alkali or alkali earth soaps of sulfonic acids prepared as such by the action of sulfuric acid of suitable strength on any substance suitable for sulfonation such as castor oil, soy bean oil, elaine, and the like; and, in general, any substance which may be included in the generic term "soap" and which will effect suitable washing.

The concentration of the soap solution should not be so great as to induce emulsification of the soakage liquid, if emulsifiable, as when oil or the like. On the other hand, the soap solution should not be too dilute, for in such case separation of the adsorbed colloids or solids from the filtering agent, the separation of the soakage liquid from the agent, and the entry of the colloids or solids into the soakage liquid, will not take place or only incompletely or with difficulty. The concentration may be approximately from about 2% to about 8% weight of soap per volume of water. The lower percentage of soap will generally be found sufficient and the larger percentages mentioned will generally be found not objectionable, but appear to have no decided advantage. The proportions mentioned are suitable for the sulfonic acid soaps from milk water and from acid sludge or acid coke. Where pure or more concentrated soaps are employed, the concentration may be from ½ of 1% to about 2%.

What I claim is:

1. The method of treating filtering material, as fullers' earth, which consists in subjecting it to the action of an aqueous soap solution.

2. The method of treating granular filtering material, which consists in subjecting said filtering material to the action of a sulfonic soap solution.

3. The method of treating filtering material, as fullers' earth, which consists in subjecting it to the action of an aqueous soap solution, washing out the soap solution, and removing the remaining moisture.

4. The method of treating filtering material, as fullers' earth, through which oily material has been filtered, which consists in subjecting the filtering material and the soakage to aqueous soap solution, and removing the separated soakage material.

5. The method of treating filtering material, as fullers' earth, through which oily material has been filtered, which consists in subjecting the filtering material and the soakage to aqueous soap solution, removing the separated soakage material, and thereafter removing the soap solution from the filtering material.

6. The method of treating filtering material, as fullers' earth, through which oily material has been filtered, which consists in subjecting the filtering material and the soakage to aqueous soap solution, removing the separated soakage material, thereafter removing the soap solution from the filtering material, and thereafter washing and drying the filtering material.

7. The method of treating fullers' earth through which oil has been filtered, which consists in washing the same with an aqueous solution of sulfonic soap, and separating the soakage oil.

8. The method of treating fullers' earth through which oil has been filtered, which consists in washing the same with an aqueous solution of sulfonic soap, separating the soakage oil, and thereafter drawing off the soap solution.

9. The method of treating fullers' earth through which oil has been filtered, which consists in washing the same with an aqueous solution of sulfonic soap, separating the soakage oil, thereafter drawing off the soap solution, and washing and drying the fullers' earth.

10. The method of treating fullers' earth through which oil has been filtered, which consists in washing the same with an aqueous solution of a soap of a sulfonic acid derived from acid sludge, removing the soap solution, and thereafter washing and drying the fullers' earth.

11. The method of treating filtering material, as fullers' earth, which consists in subjecting it to the action of an aqueous solution of sulfonic acid soap substantially free of asphaltic bodies.

12. The method of restoring filtering material, as fullers' earth, which consists in agitating the same in the presence of an aqueous soap solution, removing the soap solution, and thereafter drying the filtering material.

13. The method of treating filtering material, as fullers' earth, through which oil has been filtered for restoring it to condition for further oil filtration, which consists in washing the same with an aqueous solution of soap, separating the soakage oil containing materials washed from the filtered material, removing the remaining soap solution, and thereafter drying the filtering material.

14. The method of treating filtering material, as fullers' earth, through which oil has been filtered for restoring it to condition for further oil filtration, which consists in treating the material with a solvent for oil, washing the material with aqueous soap solution, and removing the soap solution.

15. The method of treating fullers' earth through which petroleum or petroleum product has been filtered to restore the same for further filtration of petroleum or petroleum product, which consists in washing the same with water containing in solution less than eight per cent. of soap.

16. The method of treating fullers' earth through which petroleum or petroleum product has been filtered to restore the same for further filtration of petroleum or petroleum product, which consists in washing the same with water containing in solution less than eight per cent. of soap, washing out the remaining soap solution, and thereafter drying the earth.

17. The method of treating filtering material, as fullers' earth, through which oily material has been filtered, which consists in washing the filtering material containing soakage oil with aqueous soap solution, separating soakage oil, agitating the filtering material and soap solution, again separating soakage oil, separating the filtering material from the soap solution, and washing and drying said filtering material.

18. The method of treating fullers' earth through which petroleum or petroleum product has been filtered to restore the same for further filtration of petroleum or petroleum product, which consists in subjecting the same to the action of sulfonic soap solution.

19. The method of treating fullers' earth through which petroleum or petroleum product has been filtered and containing soakage oil and impurities collected from the oily material to restore the same for further filtration of petroleum or petroleum product, which consists in agitating the fullers' earth with sulfonic soap solution, separating soakage oil and impurities carried thereby, again agitating the fullers' earth and soap solution, separating a further quantity of soakage oil and impurities, removing the bulk of said soap solution, and washing and drying the fullers' earth.

In testimony whereof I have hereunto affixed my signature this 8th day of August, 1919.

CHARLES F. KENNEDY.